United States Patent
Swearingen et al.

(10) Patent No.: US 8,643,213 B2
(45) Date of Patent: Feb. 4, 2014

(54) GENERATOR FREQUENCY CONTROLLED LOAD SHIFTING

(75) Inventors: Paul Swearingen, Rockford, IL (US); Scott J. Marks, Oregon, IL (US)

(73) Assignee: Hamilton Sundstrand, Windsor Locks, CT (US)

( * ) Notice: Subject to any disclaimer, the term of this patent is extended or adjusted under 35 U.S.C. 154(b) by 313 days.

(21) Appl. No.: 13/100,392

(22) Filed: May 4, 2011

(65) Prior Publication Data

US 2012/0280499 A1 Nov. 8, 2012

(51) Int. Cl.
*H02J 9/00* (2006.01)

(52) U.S. Cl.
USPC .............................. 307/9.1; 290/44

(58) Field of Classification Search
USPC .............................. 290/44; 307/11
See application file for complete search history.

(56) References Cited

U.S. PATENT DOCUMENTS

| | | | |
|---|---|---|---|
| 3,379,893 A * | 4/1968 | Cavanaugh | 307/41 |
| 6,127,758 A * | 10/2000 | Murry et al. | 310/168 |
| 6,317,048 B1 | 11/2001 | Bomya | |
| 6,346,892 B1 * | 2/2002 | DeMers et al. | 340/945 |
| 6,467,725 B1 * | 10/2002 | Coles et al. | 244/58 |
| 7,468,561 B2 * | 12/2008 | Kern et al. | 290/4 A |
| 7,759,821 B2 * | 7/2010 | Lando et al. | 307/66 |
| 7,861,533 B2 * | 1/2011 | Dooley | 60/778 |
| 8,066,096 B1 | 11/2011 | Francisco | |
| 8,154,148 B2 * | 4/2012 | Langlois et al. | 307/9.1 |
| 8,206,259 B2 | 6/2012 | Lang | |
| 8,299,883 B2 | 10/2012 | Katsumata | |
| 8,357,070 B2 | 1/2013 | Duong | |
| 2012/0013177 A1 * | 1/2012 | Krenz et al. | 307/9.1 |
| 2013/0062943 A1 * | 3/2013 | Bauer et al. | 307/23 |
| 2013/0076120 A1 * | 3/2013 | Wagner et al. | 307/9.1 |

* cited by examiner

*Primary Examiner* — Joseph Waks
(74) *Attorney, Agent, or Firm* — Stephen G. Mican

(57) ABSTRACT

In a power generation system that includes a ram air turbine that drives an electric generator and at least one electric bus that couples alternating current electric power from the electric generator to at least one electric load, a method of maintaining the speed of the ram air turbine within a desired range of speeds that comprises the step of uncoupling the at least one electric bus from the electric generator when the frequency of the alternating current falls under a desired minimum frequency.

23 Claims, 1 Drawing Sheet

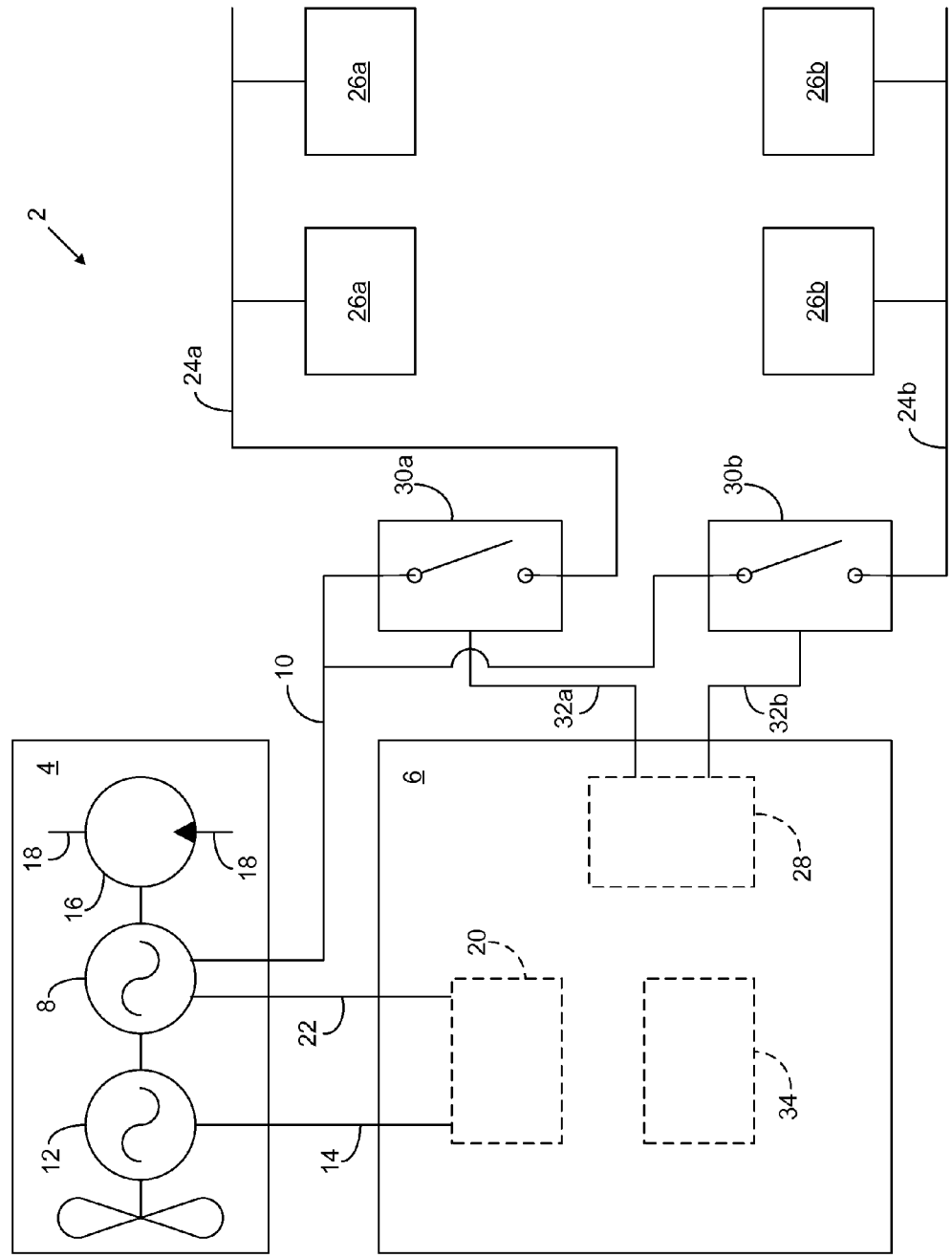

GENERATOR FREQUENCY CONTROLLED LOAD SHIFTING

The FIGURE is a schematic diagram of a power generation system according to at least one possible embodiment.

Referring to the FIGURE, a power generation system 2 according to at least one possible embodiment comprises a ram air turbine 4 and a generator control unit (GCU) 6. During operation, the ram air turbine 4 drives an electric generator 8 to generate main alternating current (AC) electric power on a main generator output line 10. The ram air turbine 4 may also drive an auxiliary electric generator 12, typically of the permanent magnet generator (PMG) type, to generate auxiliary AC electric power on an auxiliary generator output line 14, as well as a hydraulic pump 16 to generate flow of hydraulic flow lines 18.

The electric generator 8 generally requires properly regulated direct current (DC) excitation current for activation and output regulation of the electric potential that it develops under varying load. A generator controller 20 within the GCU 6 may receive the auxiliary AC electric power from the auxiliary generator output line 14 and transform this power to the desired level of excitation current for the main generator 8 by way of an excitation input line 22 to activate the electric generator 8 and regulate the electric potential of its output on the main generator output line 10.

The generator controller 20 may delay activation of the electric generator 8 with excitation current until the velocity of the ram air turbine 4 is sufficient for the electric generator 8 to produce a frequency of the main AC power on the main generator output line 10 that is at least a desired minimum generator frequency. Once the generator controller 20 activates the electric generator 8 with excitation current, it may likewise deactivate the electric generator 8 by terminating excitation current if the frequency of the main AC power on the main generator output line 10 falls below desired minimum generator frequency.

The power generation system 2 has at least one electric bus 24 that couples the main AC power from the electric generator 8 on the main generator output line 10 to at least one electric load 26. The FIGURE shows two of the electric buses 24, a primary electric bus 24a with two corresponding primary electric loads 26a, and a secondary electric bus 24b with two corresponding secondary electric loads 26b.

A contactor controller 28 within the GCU 6 opens at least one contactor 30 by means of a corresponding control line 32 between at least one of the electric buses 24 and the electric generator 8 by way of the main generator output line 10 when the frequency of the main AC power on the main generator output line 10 falls below a desired minimum frequency. The FIGURE shows two of the contactors 30, a primary contactor 30a with corresponding control line 32a that may control current flow between the main AC power on the main generator output line 10 from the electric generator 8 and the primary electric bus 24a, and a secondary contactor 30b with corresponding control line 32b that may control current flow between the main AC power on the main generator output line 10 from the electric generator 8 and the secondary electric bus 24b.

The contactor controller 28 may open both the primary contactor 30a and the second contactor 30b when the frequency of the main AC power on the main generator output line 10 falls below the desired minimum frequency. In this case, the electric load presented on the electric generator 8 shifts from full load to no load to allow the ram air turbine 4 to speed up when the frequency of the main AC power on the main generator output line 10 falls below the desired minimum frequency. Alternately, the contactor controller 28 may open the secondary contactor 30b when the frequency of the main AC power on the main generator output line 10 falls below a desired nominal frequency that is greater than the desired minimum frequency, and then the contactor controller 28 may open the primary contactor 30a when the frequency of the main AC power on the main generator output line 10 falls below the desired minimum frequency. In this case, the electric load presented on the electric generator 8 progressively shifts from partial load, that is, the primary electric loads 26a on the primary bus 24a when the frequency of the main AC power on the main generator output line 10 falls below the desired nominal frequency, to no load, if the frequency of the main AC power on the main generator output line 10 continues to fall below the desired minimum frequency.

Upon start up of the power generation system 2 and after activation of the electric generator 8 the contactor controller 28 may close both the primary contactor 30a and the secondary contactor 30b when the frequency of the main AC power on the main generator output line 10 reaches at least the desired nominal frequency. In this case, the electric load presented on the electric generator 8 shifts from no load to full load as the electric generator 8 speeds up to a velocity that allows it to produce the main AC power on the main generator output line 10 of at least the desired nominal frequency. Alternately, the contactor controller 28 may close the primary contactor 30a when the frequency of the main AC power on the main generator output line 10 reaches at least the desired minimum frequency, and then the contactor controller 28 may close the secondary contactor 30b when the frequency of the main AC power on the main generator output line 10 reaches at least the desired nominal frequency. In this case, the electric load presented on the electric generator progressively shifts from partial load, that is, the primary electric loads 26a on the primary bus 24a when the frequency of the main AC power on the main generator output line 10 rises to at least the desired minimum frequency, to full load, that is the primary electric loads 26a on the primary bus 24a combined with the secondary electric loads 26b on the secondary bus 24b, when the frequency of the main AC power on the main generator output line 10 rises to at least the desired nominal frequency.

After the frequency of the main AC power on the main generator output line 10 falls below the desired minimum frequency, a timer 34 in the GCU 6 may designate a start time when the frequency of the main AC power on the main generator output line 10 returns to the desired minimum frequency and then measures a desired length of time from the start time. The contactor controller 28 may then close at least one of the contactors 30 when the frequency of the main AC power on the main generator output line 10 rises to at least a desired maximum frequency within the desired length of time.

For instance, the contactor controller 28 may close both the primary contactor 30a and the secondary contactor 30b if the frequency of the main AC power on the main generator output line 10 rises to at least a desired maximum frequency within the desired length of time. In this case, the electric load presented on the electric generator 8 shifts from no load to full load upon reaching the desired maximum frequency within the desired length of time. Alternately, the contactor controller 28 may close the primary contactor 30a when the frequency of the main AC power on the main generator output line 10 rises to at least the desired minimum frequency and closes the secondary contactor when the frequency of the main AC power on the main generator output line 10 rises to at least the desired maximum frequency within the desired length of time. In this case, the electric load presented on the electric generator 8 shifts progressively, from partial load, that is, the primary electric loads 26a on the primary bus 24a when the frequency of the main AC power on the main generator output line 10 reaches the desired minimum frequency, to full load, as the electric generator 8 speeds up to a velocity that allows it to produce the main AC power on the main generator output line 10 of at least the desired maximum frequency within the desired length of time.

The described embodiments as set forth herein represents only some illustrative implementations of the invention as set forth in the attached claims. Changes and substitutions of various details and arrangement thereof are within the scope of the claimed invention.

The invention claimed is:

1. In a power generation system that includes a ram air turbine that drives an electric generator and at least one electric bus that couples alternating current electric power from the electric generator to at least one electric load, a method of maintaining the speed of the ram air turbine within a desired range of speeds, comprising the steps of:
   uncoupling the at least one electric bus from the electric generator when the frequency of the alternating current falls under a desired minimum frequency;
   designating a start time when the frequency of the alternating current returns to the desired minimum frequency;
   measuring a desired length of time from the start time; and
   coupling the at least one electric bus to the generator if the frequency of the alternating current reaches a desired maximum frequency within the desired length of time.

2. The method of claim 1, further comprising the steps of:
   designating a start time when the frequency of the alternating current returns to the desired minimum frequency;
   measuring a desired length of time from the start time; and
   coupling the at least one electric bus to the generator if the frequency of the alternating current reaches a desired maximum frequency within the desired length of time.

3. The method of claim 1, further comprising the steps of:
   activating the generator; and
   coupling the at least one electric bus to the generator when the frequency of the alternating current reaches a desired nominal frequency.

4. The method of claim 3, wherein the step of activating occurs when the ram air turbine velocity is sufficient for the generator to produce the frequency of the alternating current that is at least a desired minimum generator frequency.

5. The method of claim 4, further comprising the step of:
   deactivating the generator when the frequency of the alternating current falls below the desired minimum generator frequency.

6. The method of claim 1, further comprising the steps of:
   uncoupling a secondary electric bus that has a secondary electric load from the electric generator when the frequency of the alternating current falls below a desired nominal frequency; and
   uncoupling a primary electric bus that has a primary electric load from the electric generator when the frequency of the alternating current falls below the desired minimum frequency.

7. The method of claim 6, further comprising the steps of:
   activating the generator;
   coupling the primary electric bus to the electric generator when the frequency of the alternating current reaches the desired minimum frequency; and
   coupling the secondary electric bus to the electric generator when the frequency of the alternating current reaches the desired nominal frequency.

8. The method of claim 1, wherein the step of coupling the at least one electric bus to the generator further comprises the steps of:
   coupling the primary electric bus to the electric generator when the frequency of the alternating current returns to the desired minimum frequency
   and
   coupling the secondary electric bus to the electric generator if the frequency of the alternating current reaches a desired maximum frequency within the desired length of time.

9. The method of claim 8, wherein the step of activating occurs when the ram air turbine velocity is sufficient for the generator to produce the frequency of the alternating current that is at least a desired minimum generator frequency.

10. The method of claim 9, further comprising the step of:
    deactivating the generator when the frequency of the alternating current falls below the desired minimum generator frequency.

11. In a ram air turbine power generation system that includes a ram air turbine that drives an electric generator and at least one electric bus that couples alternating current electric power from the electric generator to at least one electric load, a method of maintaining the speed of the ram air turbine within a desired range of speeds, comprising the steps of:
    activating the generator;
    coupling the at least one electric bus to the electric generator when the frequency of the alternating current reaches a desired nominal frequency;
    uncoupling the generator from the at least one electric bus when the frequency of the alternating current falls under a desired minimum frequency;
    designating a start time when the frequency of the alternating current returns to the desired minimum frequency;
    measuring a desired length of time from the start time; and
    coupling the at least one electric bus to the electric generator if the frequency of the alternating current reaches a desired maximum frequency within the desired length of time.

12. The method of claim 11, wherein the step of activating occurs when the ram air turbine velocity is sufficient for the generator to produce the frequency of the alternating current that is at least a desired minimum generator frequency.

13. The method of claim 12, further comprising the step of:
    deactivating the generator when the frequency of the alternating current falls below the desired minimum generator frequency.

14. A power generation system that includes a ram air turbine that drives an electric generator and at least one electric bus that couples alternating current electric power from the electric generator to at least one electric load, comprising:
    a contactor controller that opens at least one contactor between the at least one electric bus and the electric generator when the frequency of the alternating current falls under a desired minimum frequency; and
    a timer that designates a start time when the frequency of the alternating current returns to the desired minimum frequency and measures a desired length of time from the start time;
    wherein the contactor controller closes the at least one contactor if the frequency of the alternating current reaches a desired maximum frequency within the desired length of time.

15. The power generation system of claim 14, further comprising:
a timer that designates a start time when the frequency of the alternating current returns to the desired minimum frequency and measures a desired length of time from the start time;
wherein the contactor controller closes the at least one contactor if the frequency of the alternating current reaches a desired maximum frequency within the desired length of time.

16. The power generation system of claim 14, further comprising:
a generator controller that activates the generator;
wherein the contactor controller closes the at least one contactor when the frequency of the alternating current reaches a desired nominal frequency.

17. The power generation system of claim 16, wherein the generator controller activates the generator when the ram air turbine velocity is sufficient for the generator to produce the frequency of the alternating current that is at least a desired minimum generator frequency.

18. The power generation system of claim 17, wherein the generator controller deactivates the generator when the frequency of the alternating current falls below the desired minimum generator frequency.

19. The power generation system of claim 14, wherein the contactor controller opens a secondary contactor between a secondary electric bus that has a secondary electric load and the electric generator when the frequency of the alternating current falls below a desired nominal frequency and opens a primary contactor between a primary electric bus that has a primary electric load and the electric generator when the frequency of the alternating current falls below the desired minimum frequency.

20. The power generation system of claim 19,
wherein the contactor controller closes the primary contactor when the frequency of the alternating current returns to the desired minimum frequency and closes the secondary contactor between the secondary electric bus and the electric generator if the frequency of the alternating current reaches a desired maximum frequency within the desired length of time.

21. The power generation system of claim 20, further comprising:
a generator controller that activates the generator;
wherein the contactor controller closes the primary contactor when the frequency of the alternating current reaches the desired minimum frequency and closes the secondary contactor when the frequency of the alternating current reaches the desired nominal frequency.

22. The power generation system of claim 21, wherein the generator controller activates the generator when the ram air turbine velocity is sufficient for the generator to produce the frequency of the alternating current that is at least a desired minimum generator frequency.

23. The power generation system of claim 22, wherein the generator controller deactivates the generator when the frequency of the alternating current falls below the desired minimum generator frequency.

* * * * *